United States Patent
Kitchaev et al.

(10) Patent No.: US 12,126,060 B2
(45) Date of Patent: Oct. 22, 2024

(54) CHEMICAL AND ELECTROCHEMICAL CELL ELECTRONICS PROTECTION SYSTEM

(71) Applicant: Robert Bosch GmbH, Stuttgart (DE)

(72) Inventors: Daniil A. Kitchaev, Brookline, MA (US); Mordechai Kornbluth, Brighton, MA (US); Karim Gadelrab, Boston, MA (US); Jonathan Mailoa, Cambridge, MA (US); Charles Tuffile, Swansea, MA (US)

(73) Assignee: Robert Bosch GmbH, Stuttgart (DE)

(*) Notice: Subject to any disclaimer, the term of this patent is extended or adjusted under 35 U.S.C. 154(b) by 431 days.

(21) Appl. No.: 17/692,327

(22) Filed: Mar. 11, 2022

(65) Prior Publication Data
US 2023/0290973 A1    Sep. 14, 2023

(51) Int. Cl.
*H01M 8/04082* (2016.01)
*B01D 53/32* (2006.01)
*C25B 15/08* (2006.01)
*F04B 17/00* (2006.01)

(52) U.S. Cl.
CPC ...... *H01M 8/04201* (2013.01); *B01D 53/326* (2013.01); *C25B 15/08* (2013.01); *F04B 17/00* (2013.01); *B01D 2257/108* (2013.01)

(58) Field of Classification Search
CPC .......................... B01D 53/326; H01M 8/0662
See application file for complete search history.

(56) References Cited

U.S. PATENT DOCUMENTS

| | | | |
|---|---|---|---|
| 4,224,384 A | 9/1980 | Kozawa et al. | |
| 4,620,914 A * | 11/1986 | Abens | C25B 1/02 205/639 |
| 8,889,307 B2 | 11/2014 | Lundblad et al. | |
| 10,301,179 B2 | 5/2019 | Sakai et al. | |
| 10,550,486 B2 | 2/2020 | Yakumaru et al. | |
| 2003/0082428 A1* | 5/2003 | Boneberg | H01M 8/04228 429/408 |

(Continued)

FOREIGN PATENT DOCUMENTS

| | | | | |
|---|---|---|---|---|
| CN | 110459787 A | * | 11/2019 | ........... H01M 8/0662 |
| WO | WO-2022248818 A1 | * | 12/2022 | ........... H01M 16/006 |

OTHER PUBLICATIONS

Machine translation of Liu et al (CN 110459787 A) (Year: 2019).*

(Continued)

*Primary Examiner* — Harry D Wilkins, III
(74) *Attorney, Agent, or Firm* — BROOKS KUSHMAN P.C.

(57) ABSTRACT

An electrochemical system includes a hydrogen diffusion barrier physically separating the system into a hydrogen rich zone and a hydrogen poor zone, an electronic component located in the hydrogen poor zone and exposed to hydrogen diffusing from the hydrogen rich zone, a hydrogen pump, located in the hydrogen rich zone and the hydrogen poor zone, including: a cathode, an anode, an electrolyte separating the cathode and the anode, an anode encapsulation contacting the anode and a portion of the electrolyte, and an external electrical circuit biased to drive H+ current from the anode to the cathode to pump hydrogen diffusing from the hydrogen rich zone into the hydrogen poor zone back into the hydrogen rich zone.

20 Claims, 4 Drawing Sheets

(56) References Cited

U.S. PATENT DOCUMENTS

| | | | |
|---|---|---|---|
| 2004/0151966 A1 | 8/2004 | Dahlgren et al. | |
| 2005/0058861 A1* | 3/2005 | Pettit | H01M 8/04014 |
| | | | 429/441 |
| 2005/0058865 A1 | 3/2005 | Thompson et al. | |
| 2008/0020245 A1* | 1/2008 | Milacic | H01M 8/0662 |
| | | | 429/57 |
| 2009/0186245 A1* | 7/2009 | Frank | H01M 8/0662 |
| | | | 429/431 |
| 2009/0258279 A1* | 10/2009 | Knepple | H01M 8/04089 |
| | | | 429/515 |
| 2012/0024715 A1* | 2/2012 | Glatzmaier | B01D 71/02231 |
| | | | 205/337 |
| 2012/0237843 A1 | 9/2012 | Paganelli | |
| 2015/0118595 A1 | 4/2015 | Hasegawa et al. | |
| 2015/0321013 A1* | 11/2015 | Smith | H01M 50/284 |
| | | | 607/116 |
| 2019/0115617 A1 | 4/2019 | Pan et al. | |
| 2021/0143461 A1 | 5/2021 | Kim et al. | |
| 2021/0399327 A1 | 12/2021 | Zhao et al. | |
| 2022/0298656 A1 | 9/2022 | Takasugi et al. | |
| 2022/0344691 A1 | 10/2022 | Mutolo et al. | |
| 2022/0396480 A1 | 12/2022 | Edlund | |
| 2023/0231166 A1 | 7/2023 | Qiu et al. | |
| 2023/0287590 A1* | 9/2023 | Kitchaev | C25B 9/65 |
| 2023/0290976 A1* | 9/2023 | Kitchaev | H01M 8/188 |

OTHER PUBLICATIONS

R. Akilan et al., "Reconnoitring the nature of interaction and effect of electric filed on Pd/Pt/Ni decorated 5-8-5/55-77 defected graphene sheet for hydrogen storage" International Journal of Hydrogen Energy 45 (2020) pp. 744-763.

Z. Ao et al., "Electric Field manipulated reversible hydrogen storage in graphene studied by DFT calculations." Phys. Status Solidi A., (2014) 211:351-356.

F. Beck et al., "Rechargeable batteries with aqueous electrolytes," Electrochimica Acta, 45 (2000), 2467-2482.

J. Hong et al., "A Highly Sensitive Hydrogen Sensor with Gas Selectivity using a PMMA Membrane-Coated Pd Nanoparticle/Single_Layer Graphene Hybrid," Applied Materials & Interfaces, (2015), pp. 3554-3561.

D. Kitchaev et al., "Thermodynamics of Phase Selection of MnO2 Framework Structures through Alkali Intercalation and Hydration," Journal of the American Chemical Society, 139 (7), pp. 2672-2681.

A. Kozawa, "Hydrogen Gas Absorber Made of Manganese Dioxide," J. Electrochem. Society, (1976), vol. 128, No. 8, pp. 1194-1195.

M. Nogami et al., "Hydrogen sensor prepared using fast proton-conducting glass films," ScienceDirect, (2006) 266-269.

K. Perry et al., "Electrochemical hydrogen pumping using a high-temperature polybenzimidazole (PBI) membrane", ScienceDirect, Journal of Power Sources 177 (2008) 478-484.

M. Singla et al., "Theoretical investigations of hydrogen gas sensing and storage capacity of graphene-based materials: A review," Sensors and Actuators: A. Physical 332 (2021) 113118.

S. Turner et al., "Defects in nsutite (γ-MnO2) and dry-cell battery efficiency" Nature vol. 304 (1983). pp. 143-146.

M. Watada et al., "Develpment Trend of Rechargeable Nicke-Metal Hydride Battery for Replacement of Dry Cell," GS Yuasa Technical Report, 2006, pp. 46-53.

P. Xiao et al., A Review of Phosphide-Based Materials for Electrocatalytic Hydrogen Evolution, Advanced Energy Materials (2015) pp. 1-37.

K. Zhang et al., "Electric field induced enhancement of hydrogen storage capacity for Li atom decorated graphene with Stone-Wales defects," ScienceDirect, International Journal of Hydrogen Energy 41 (2016) 10776-10785.

NPL_Vanga, et al., "Novel synthesis of combined sorbent-catalyst material for sorption enhanced stream reforming processes," Jan. 17, 2019, Elsevier, Ceramics International, 7594-7605 (Year: 2019).

Chen et al., "Hydrogen storage performance in palladium-doped graphene/carbon composites", International Journal of Hydrogen Energy, vol. 38, No. 9, Mar. 2013, pp. 3681-3688 (Year: 2013).

Sheng et al., Octagraphene as a versatile carbon atomic sheet for novel nanotubes, unconventional fullerenes, and hydrogen storage, Journal of Applied Physics, vol. 112, No. 7, Oct. 2012, pp. 074315-1 to 074315-7 (Year: 2012).

Ao et al., "Electric Field Activated Hydrogen Dissociative Adsorption to Nitrogen -Doped Graphene", The Journal of Physical Chemistry C, vol. 114, No. 34, Aug. 2010, pp. 14503-14509 (Year: 2010).

* cited by examiner

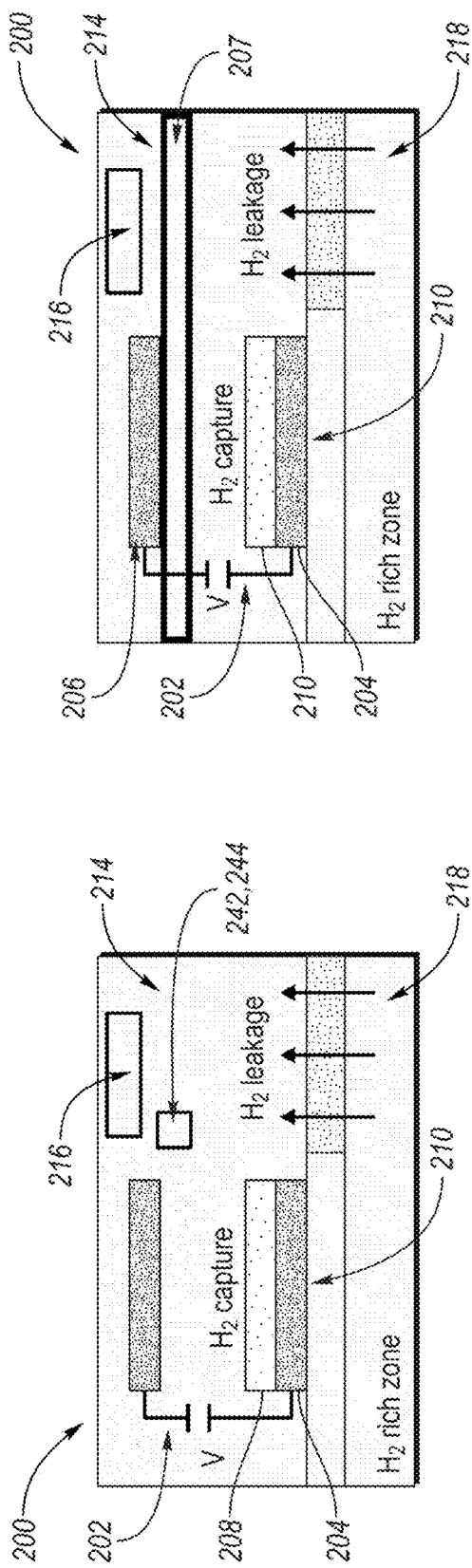
FIG. 6A
FIG. 6B
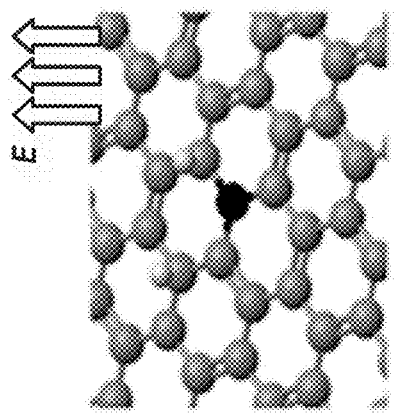
FIG. 7C
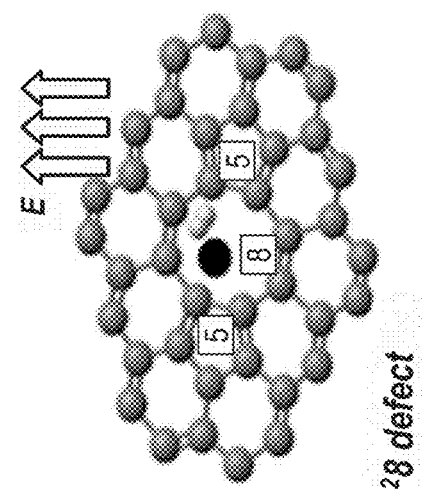
FIG. 7B
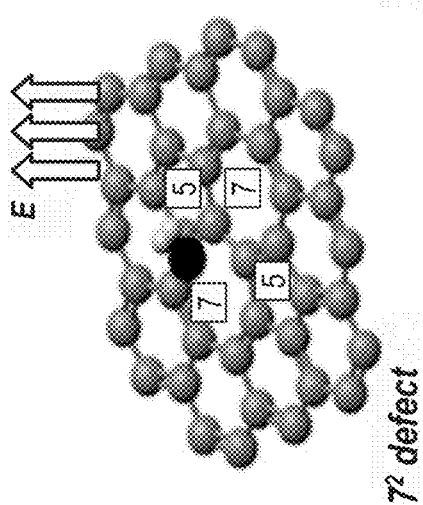
FIG. 7A

CHEMICAL AND ELECTROCHEMICAL CELL ELECTRONICS PROTECTION SYSTEM

TECHNICAL FIELD

The present disclosure relates to materials and systems to be utilized for prevention of hydrogen contamination of electronic components in chemical and electrochemical cells and methods of using the same.

BACKGROUND

Various electronic components of chemical and electrochemical systems are routinely exposed to high concentrations of hydrogen gas. Avoiding the buildup of hydrogen pressure in the hydrogen-based chemical and electrochemical systems is a requirement especially near electronic components since electronic damage and electrical discharge negatively impact system performance. The hydrogen gas negatively influences function and lifetime of the digital components. As chemical and electrochemical systems are becoming an increasingly popular source of electrical energy, the protection of the electronic components requires new solutions.

SUMMARY

In at least one embodiment, an electrochemical system is disclosed. The system may include a hydrogen diffusion barrier physically separating the system into a hydrogen rich zone and a hydrogen poor zone. The system may also include an electronic component located in the hydrogen poor zone and exposed to hydrogen diffusing from the hydrogen rich zone. The system may also include a hydrogen pump, located in the hydrogen rich zone and the hydrogen poor zone. The pump may include a cathode, an anode, an electrolyte separating the cathode and the anode, an anode encapsulation contacting the anode and a portion of the electrolyte. The pump may include an external electrical circuit biased to drive H+ current from the anode to the cathode to pump hydrogen diffusing from the hydrogen rich zone into the hydrogen poor zone back into the hydrogen rich zone. The hydrogen pump may operate at a thermodynamic equilibrium state. The hydrogen pump may be a continuously running pump. The anode encapsulation may include a material selectively permeable to $H_2$, but not to CO, $CO_2$, and/or $NO_2$. The anode may have a catalyst configured to perform hydrogen oxidation reaction with minimum overpotential. The system may have a mode of $H_2$ partial pressure at the cathode being the same as $H_2$ partial pressure in the hydrogen rich zone. The system may have a mode of $H_2$ partial pressure at the anode being the same as $H_2$ partial pressure in the hydrogen poor zone. The electrical component may be programmed to maintain hydrogen concentration in the hydrogen poor zone below a pre-determined level. The hydrogen pump may be integrated into the hydrogen diffusion barrier.

In another embodiment, an electrochemical system is disclosed. The system may include a symmetrical electrochemical cell, divided by a physical diffusion barrier, into a cathode side and an anode side. The cell may include a cathode and an anode, each configured to perform hydrogen redox reaction, an electrolyte layered between the cathode and the anode, and an electrical circuit biased to drive H+ current from the anode to the cathode, and a controller located on the anode side and programmed to maintain hydrogen concentration on the anode side below a predetermined level by setting voltage bias of the electrical circuit. The controller may be further programmed to set the voltage bias based on a value of partial pressure on the cathode side. The controller may be further programmed to operate the cell at a thermodynamic equilibrium state. The system may further include an encapsulation on the anode side. The controller may be a central processing unit.

In yet another embodiment, a method is disclosed. The method may include, by a controller, operating a hydrogen pump located within an electrochemical cell to maintain a hydrogen concentration relative to an electronic component in a hydrogen poor zone of the cell below a predetermined level based on a partial pressure value in a hydrogen rich zone. The operating may include applying voltage bias across an external circuit to drive proton transport across an electrolyte from an anode, in the hydrogen poor zone, to a cathode, in the hydrogen rich zone of the cell. The operating may include continuously operating the hydrogen pump. The method may also include measuring $H_2$ concentration in the hydrogen poor zone relative to $H_2$ concentration of the hydrogen rich zone based on the circuit voltage. The controller may be located in the hydrogen poor zone. The controller may be further programmed to operate the hydrogen pump at a thermodynamic equilibrium state.

BRIEF DESCRIPTION OF THE DRAWINGS

FIGS. 6A and 6B show non-limiting examples of a chemical or electrochemical system structured to achieve hydrogen capture and minimize hydrogen build up in hydrogen poor or free zone of the system;

FIGS. 7A, 7B, and 7C show non-limiting examples of hydrogen capture material of adsorbing electrode of the systems depicted in FIGS. 6A and 6B.

DETAILED DESCRIPTION

Figure 1:
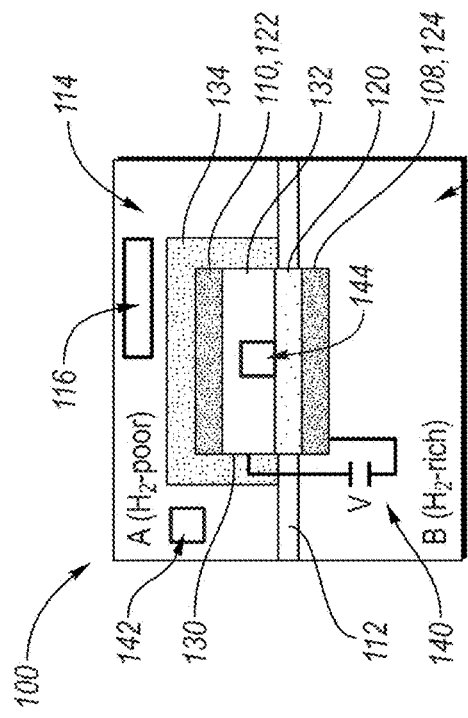
FIG. 1 shows a schematic depiction of a prior art electrochemical cell with electronics components and a physical diffusion barrier.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value. The term "substantially" may modify a value or relative characteristic disclosed or claimed in the present disclosure. In such instances, "substantially" may signify that the value or relative characteristic it modifies is within +0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures. The terms "compound" and "composition" are used interchangeably.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Chemical and electrochemical systems utilizing hydrogen as a fuel source are considered the energy systems of the future either in direct hydrogen combustion engines or fuel cells. These hydrogen-producing devices are becoming increasingly popular due to their ability to produce clean energy. The systems may include fuel cells, electrolysis cells or electrolyzers, and battery cells. Fuel cells, or electrochemical cells, that convert chemical energy of a fuel (e.g. $H_2$) and an oxidizing agent into electricity through a pair of electrochemical half (redox) reactions, have become an increasingly popular hydrogen-fuel-generating technology. Fuel cells are now a promising alternative transportation technology capable of operating without emissions of either toxins or green-house gases. An electrolyzer is an electrochemical device designed to convert electricity and water into hydrogen and oxygen, which may be in turn used to store energy. The electrolyzer utilizes electrolysis for hydrogen production. Besides fuel cells, the electrolyzer may be utilized in other applications including industrial, residential, and military applications and technologies focused on energy storage such as electrical grid stabilization from dynamic electrical sources including wind turbines, solar cells, or localized hydrogen production.

The environment in these systems is highly corrosive. Identifying suitable materials for individual components of the cells has been a challenge in the industry. In these systems, especially control over hydrogen leakage and hydrogen pressure buildup in various system components is of high importance to meet high levels of performance and safety. In the presence of hydrogen, hydrides formation and hydrogen doping may be present especially under conditions of accelerated reactions such as high pressure and temperature.

The highly corrosive environment also negatively impacts control electronics present in the systems and cells. Control electronics in the cells such as in hydrogen fuel-cell vehicles may be located near environments containing high partial pressures of $H_2$ gas, for example in the high hydrogen anode. For example, the hydrogen recirculation pump at the fuel cell must be immediately adjacent to the primary hydrogen input to the fuel cell. Traditionally, the electronics used to control this pump, or another fuel cell-adjacent component, are in immediate proximity to the hydrogen stream, where the risk of exposure to concentrated $H_2$ is relatively high. Exposure of electronic components to hydrogen-rich atmosphere is known to cause changes in the components' properties. The formed phases of material hydrides may alter the electronic properties of semiconducting devices or mechanical properties of structural components. For example, the doping levels of semiconductors may be negatively influenced. The degradation of many electronics components may be thus accelerated, for example, through the formation of the metal hydrides at metal contacts and/or the hydrogen embrittlement of structural metals.

Moreover, the performance and degradation of electronic components in hydrogen-rich atmosphere is not routinely tested or guaranteed by suppliers. This may result in undesirable uncertainty in the lifetime of the product.

Typically, control electronics have been isolated from the hydrogen stream in an electrochemical environment through a physical diffusion barrier. A schematic depiction of an electrochemical cell 10 with the physical diffusion barrier 12 is shown in FIG. 1. The cell 10 includes a first chamber A 14, where one or more electronics components 16 are located and presence of hydrogen is undesirable. The chamber A 14 is separated from the chamber B 18, where hydrogen is supposed to be present. The cell 10 further contains typical electrochemical cell portions such as the electrolyte or proton electrolyte 20, and catalysts on the anode and cathode sides. Depicted here is the hydrogen oxidation reaction (HOR) catalyst 22 on the anode side and hydrogen evolution reaction (HER) catalyst 24 on the cathode side.

The diffusion barrier 12 typically lacks sufficient effectiveness and $H_2$ leakage through the diffusion barrier 12 is relatively high. The influx of hydrogen through the barrier 12 typically increases at higher temperatures and over an extended period of time. But leakage of hydrogen through the barrier 12 towards the electronics 16 may be problematic even at ambient temperatures over a long period of time.

Alternatively, hermetic seals, passive seals, pressure release systems, and barrier coatings have been tested and implemented to minimize permeation of hydrogen gas towards the electronics components. But hydrogen tends to leak through any barrier given its small atomic size. As such, neither seal or coating has proven to be sufficiently effective and/or reliable, especially over extended periods of time.

Therefore, there is a need to secure protection of the electronics, such as controls electronics, in the electrochemical cells such as a hydrogen fuel cell powertrain, and gain and maintain control over hydrogen leakage and buildup in system components of chemical and electrochemical systems. In addition, the protection mechanism should be efficient, affordable, and dimensionally appropriate for the chemical and/or electrochemical cell environment. The protection mechanism should not waver in effectiveness during fluctuating temperature and/or pressure ranges and for an extended period of time.

Figure 2A:
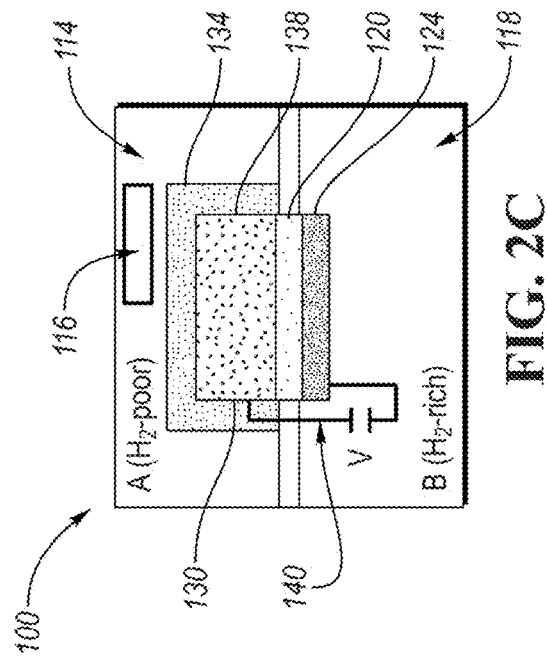
FIG. 2A shows a schematic depiction of a non-limiting example of an electrochemical cell with a sorbent and a sorbent encapsulation according to one or more embodiments disclosed herein.
Figure 2B:
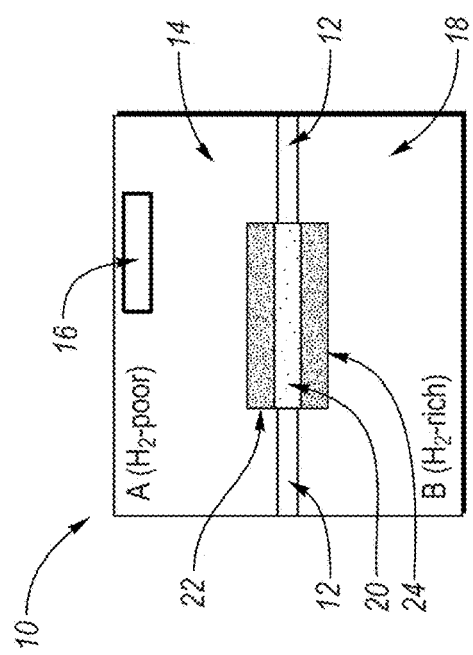
FIG. 2B shows a schematic depiction of another non-limiting example of an electrochemical cell with a sorbent and a sorbent encapsulation.
Figure 2C:
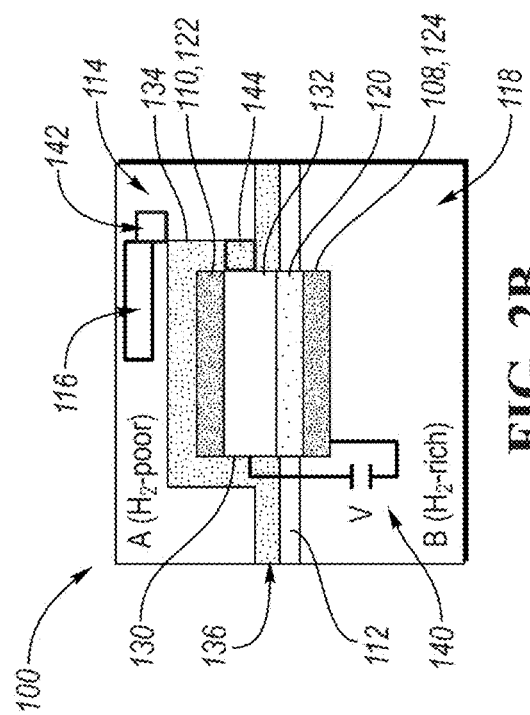
FIG. 2C shows a schematic depiction of another non-limiting example of an electrochemical cell with a sorbent and a sorbent encapsulation.

In one or more embodiments, a hydrogen capture and release system is disclosed. The system includes a chemical or an electrochemical cell 100. The cell 100 may be a fuel cell, electrolyzer cell, battery cell. A non-limiting example of the cell 100 is shown in FIGS. 2A-2C. The cell 100 has a chamber A 114 including one or more electronics components 116, schematically depicted. Presence of hydrogen or hydrogen stream is not desirable in the chamber A 114 such that concentration of hydrogen in chamber A is 0 or c1 which is a predetermined value, lower than concentration of hydrogen c2 which is present in chamber B. Chamber A thus has a generally hydrogen-poor environment and chamber B has a generally hydrogen-rich environment. Chamber B may be physically separated from chamber A by a physical diffusion barrier 112.

The non-limiting example electronics components 116 may be controls, central control units (CCU)s, power electronics, converters, inverters, switching devices, metal oxide semiconductor field effect transistor (MOSFET). insulated gate bipolar transistor (IGBT), thyristors or silicon controlled rectifiers (SCRs), switching regulators, capacitors, supercapacitors, the like, or a combination thereof.

The cell 100 further includes the cathode 108, the anode 110, the electrolyte 120, HOR catalyst 122 on the anode side, and HER catalyst 124 on the cathode side.

The cell 100 includes a protective system 130 for the electronics components 116. The protective system or assembly 130 includes one or more portions. The one or more portions of the protective system 130 may include a sorbent material 132. The sorbent 132 may be arranged as one or more layers in chamber A 114 of the cell 100. The sorbent 132 may be arranged adjacent to, directly adjacent to, or in direct contact with the electrolyte 120, HOR catalyst 122 of the anode, or both. The sorbent 132 may form an intermediate layer between the electrolyte 120 and the HOR catalyst 122 of the anode. The sorbent 132 may have a greater or smaller thickness than the HOR catalyst 122, the electrolyte 120, or the HER catalyst 124.

The sorbent 132 may be encapsulated in a containment, container, sub cell, case, sub chamber, encapsulation, or the like. The encapsulation 134 may be arranged adjacent to, directly adjacent to, or in direct contact with the sorbent 132, the electrolyte 120, the anode 110, the HOR 122, the diffusion barrier 112, or a combination thereof. The contact between the encapsulation 134 and the sorbent 132, the electrolyte 120, the anode 110, the HOR catalyst 122, the diffusion barrier 112 may be partial or full. For example, as can be seen in FIG. 2A, the encapsulation 134 may have a partial contact with the diffusion barrier 112. In contrast, FIG. 2B shows an extended direct contact between the encapsulation 134 and the diffusion barrier 112. The encapsulation 134 may extend from a side of the cell 136 to the sorbent 132. The diffusion barrier 112 may be in contact with the encapsulation 134 along its entire length. The encapsulation 134 may be made from a material that is selectively permeable to hydrogen to prevent contamination by other gases, for example contamination by any catalyst(s) used to aid the sorption kinetics. The cell 100 may thus include a stack of a cathode including the HER catalyst 124, the electrolyte 120, the sorbent 132, the anode including the HOR catalyst 122, and the encapsulation 134.

The sorbent 132 may be mixed with a catalyst. For example, the sorbent 132 may be mixed with the HOR catalyst 122 to form a sorbent/anode/anode catalyst layer 138, as is depicted in a non-limiting example of FIG. 2C.

The sorbent 132 may actively absorb hydrogen in chamber A 114 which contains the electronics components 116. The sorbent 132 may have strong driving force for hydrogen uptake of at least about 5-20, 7-15, or 8-10 kJ/mol $H_2$. The sorbent 132 may spontaneously take up hydrogen. The sorbent 132 may do so by sorption, chemisorption, physical adsorption, absorption, or a combination thereof. The sorbent may have a relatively high capacity to absorb/adsorb hydrogen. The absorption/adsorption of hydrogen within the sorbent 132 may proceed until a saturation point is reached. The saturation point of the sorbent 132 is a point at which the sorbent has no more capacity for additional hydrogen uptake.

The sorbent 132 may be rechargeable. The sorbent 132 may passively maintain the $H_2$ partial pressure until the sorbent 132 becomes saturated, at which point the sorbent 132 needs to be recharged. For the recharge purposes, the system 130 may include a recharge-enabling portion(s). The portions may include an electrical circuit 140. The circuit may be external with respect to the system, cell, stack. The circuit may be internal with respect to the system, cell. The portions may be included in chamber A, B, or both. For example, chambers A and B may include an external circuit 140. The circuit 140 may be connected to the cathode 108 and the sorbent 132. The external circuit may be an electrochemical circuit 140 which may actively pull hydrogen from the sorbent 132 into chamber B 118. The external circuit 140 may apply voltage bias during the recharge cycle to remove the adsorbed hydrogen.

Figure 3:
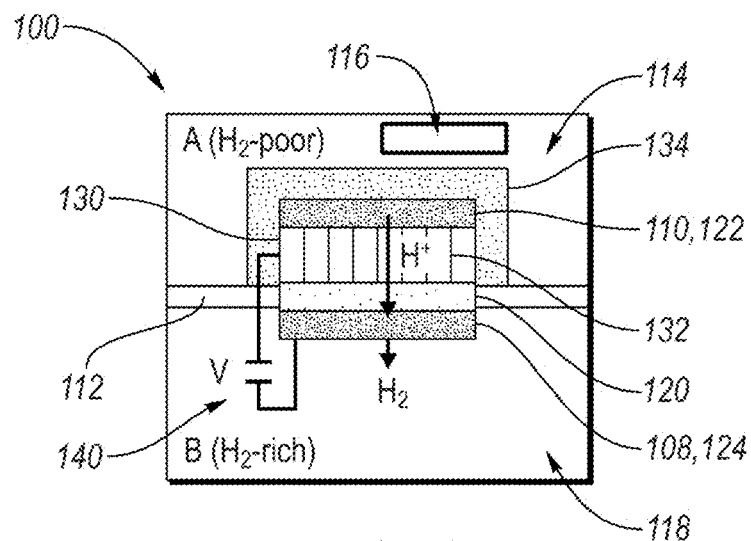
FIG. 3 shows a schematic depiction of a non-limiting example of an electrochemical cell with a sorbent and a sorbent encapsulation in a first or proton exchange state.

The cell 100, the system 130, or both have three different states. The first or proton exchange state, the second or sorption state, and the third or regeneration state. In the first state, the system 130 functions as atypical electrochemical cell and is schematically depicted in FIG. 3. The first state includes proton transport across the electrolyte 120. In the first state, hydrogen leakage into chamber A 114 may occur. In the first state, the sorbent 132 is not saturated. In the first state, the sorbent 132 has capacity to take up, absorb, and/or adsorp hydrogen. In the first state, the sorbent 132 is not actively taking up hydrogen. Switch from the first state to the second state is activated when a predetermined maximum amount of hydrogen in chamber A 114 is reached and/or detected. The determination may be made, for example, by a controls unit 116 of the cell 100 based on one or more inputs from one or more sensors such as gas sensor(s) 142.

The second or sorption state includes the sorbent 132 before the saturation point is reached. In the second state, the sorbent 132 is not saturated and has capacity to take up, absorb, and/or adsorp hydrogen. In the second state, proton transport across the electrolyte 120 is stopped. In the second state, hydrogen may enter the sorbent 132 material, and a reaction where hydrogen is split into H and ions may proceed. In the second state, spontaneous hydrogen adsorption maintains the hydrogen concentration in chamber A 114 below a predetermined concentration level. In the second state, hydrogen transport from chamber B 118 is being blocked by a voltage bias, electrolyte resistance, or both, as is discussed below.

Figure 4:
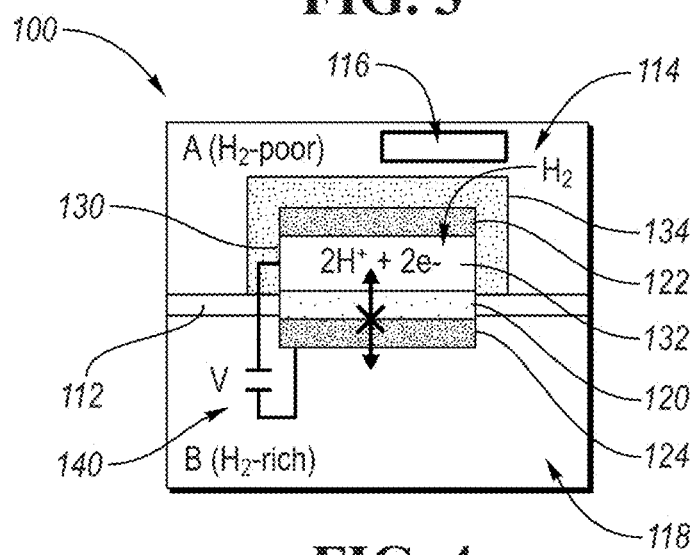
FIG. 4 shows a schematic depiction of a non-limiting example of an electrochemical cell with a sorbent and a sorbent encapsulation in a second or sorption state.

The second state is schematically shown in FIG. 4. The active sorbent material M spontaneously absorbs hydrogen to form a stable $MH_x$ material in the following reaction:

$$M + x/2 H_2 \rightarrow MH_x \qquad (1).$$

While the formation of $MH_x$ is thermodynamically favorable, the reaction may be catalyzed by the HOR catalyst 122. In the second state, only $H_2$ from chamber A is being absorbed, and any $H_2$ from chamber B is being blocked by preventing any proton transport across the electrolyte.

Additionally, to counter the slow kinetics of hydrogen release, the reaction of the second state may be assisted by elevating the temperature of the system 130 by about 100 to 200° C. compared to initial temperature of the system 130, cell 100 during the first state.

The excess $H_2$ diffusion from chamber B 118 may be prevented by one or more of the following strategies: (a) maintaining a bias voltage across the proton electrolyte 120 adjusted to be equal to the open circuit voltage so that the measured current across the external circuit 140 is zero, (b) disconnecting the external circuit 140 to block ion transport across the electrolyte 120, (c) choosing an electrolyte 120 material with poor conductivity at ambient temperatures and good conductivity at elevated temperatures so that the proton transport across the electrolyte 120 is only appreciable when the temperature is artificially elevated, for example during the recharge cycle or the third state.

Switch from the second state to the first state is activated when a predetermined minimum amount of hydrogen in chamber A 114 is reached and/or detected. The determination may be made, for example, by a controls unit 116 of the cell 100 based on one or more inputs from one or more sensors such as gas sensor(s) 142.

Switch from the second state to the third state is activated when a predetermined maximum amount of hydrogen in the sorbent 132 is reached and/or detected. The determination may be made, for example, by a controls unit 116 of the cell 100 based on one or more inputs from one or more sensors such as voltage sensor(s) 144.

In the third state or regeneration, the sorbent 132 is being regenerated. The third state includes electrochemical regeneration of the sorbent 132 material. In the third state, hydrogen is driven out of the sorbent 132, across the proton electrolyte 120, and into chamber B 118 under an applied voltage bias. In the third state, the temperature of the cell 100, sorbent 132, or both may be increased to aid regeneration of the sorbent 132. The temperature increase may be about 100 to 200° C. compared to initial temperature of the system 130, cell 100, or both during the first state, the second state, or both.

Figure 5:
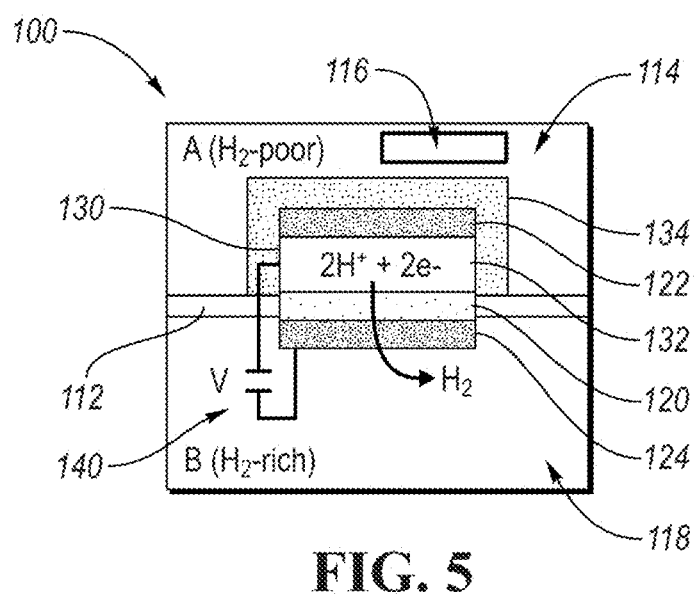
FIG. 5 shows a schematic depiction of a non-limiting example of an electrochemical cell with a sorbent and a sorbent encapsulation in a third or regeneration state.

By applying a voltage bias across the proton electrolyte 120, protons are removed from the active sorbent material 132 and moved to the HER catalyst 124 of the cathode. In the HER catalyst 124, the protons are reduced to hydrogen gas. The third state is schematically shown in FIG. 5. The regeneration and desorption of the sorbent 132 is driven electrochemically in the following reaction:

$$MH_x \rightarrow M + x/2 H_2 \qquad (2).$$

Switch from the third state to the first state is activated when a predetermined minimum amount of hydrogen in the sorbent 132 is reached and/or detected. The determination may be made, for example, by a controls unit 116 of the cell 100 based on one or more inputs from one or more sensors such as voltage sensor(s) 144.

The cell 100 and/or the system 130 may include one or more gas sensors 142 to determine the quantity or concentration of $H_2$ present in the chamber A 114. The one or more gas sensors 142 are schematically depicted in FIG. 2A. The one or more gas sensors 142 may be used to determine when the switch between states should happen. When the gas sensor(s) 142 indicate that a concentration of hydrogen in chamber A exceeded a predetermined maximum value, the cell's control system may initiate a switch from the first state to the second state. When the gas sensor(s) 142 indicate that a concentration of hydrogen in chamber A reached a predetermined minimum value, the cell's control system may initiate a switch from the second state to the first state. The gas sensor(s) 142 may be located in the vicinity of, adjacent to, directly adjacent to, or removed from the one or more electronic components 116, the encapsulation 134, the diffusion barrier 112, or a combination thereof.

The cell 100 and/or the system 130 may include one or more voltage sensors 144 to determine the quantity or concentration of $H_2$ present in the sorbent 132. The voltage sensors 144 may measure the open-circuit voltage against a known reference (e.g. the cell stack) and thus measure the amount of $H_2$ present in the sorbent 132. The one or more voltage sensors 144 are schematically depicted in FIG. 2A. The one or more voltage sensors 144 may be used to determine when the switch between states should happen. When the voltage sensor(s) 144 indicate that a concentration of hydrogen in the sorbent 132 exceeded a predetermined maximum value, the cell's control system may initiate a switch from the second state to the third state. When the voltage sensor(s) 144 indicate that a concentration of hydrogen in the sorbent 132 was lowered by the regeneration to a predetermined minimum value, the cell's control system may initiate a switch from the third state to the first state. The voltage sensor(s) 144 may be located in the vicinity of, adjacent to, directly adjacent to, or within the sorbent 132, the anode/sorbent mixed material 138, the encapsulation 134, the electrolyte 120, the anode 110, or a combination thereof.

The sensors 142, 144 may be connected to a central processing unit (CPU), processing unit, memory, etc. that runs an algorithm to determine the conditions at which to activate the switch from the first to the second state, the second to the first state, the second to the third state, or the third to the first state.

The sorbent 132 may include one or more materials. The sorbent 132 may include one material or may be a mixture of materials. The material may have one or more of the following properties. The material may absorb hydrogen, adsorb hydrogen, or both. Sorption, adsorption, and absorption are used herein interchangeably, indicating that any sorption mechanism is applicable. The material may uptake hydrogen spontaneously. The material may be an active sorption material. The material may have a strong driving force for hydrogen absorption, good sorption kinetics at room temperature, substantial hydrogen storage capacity, allow for proton transport, or a combination thereof.

The material may include manganese dioxide ($MnO_2$), gamma-$MnO_2$ often referred to as electrochemical manganese dioxide (EMD), nickel oxide hydroxide (NiOOH), or both. EMD and NiOOH may operate in the dry cell conditions and have capacity for a substantial amount of hydrogen uptake. Each material has its own advantage. EMD has twice the total hydrogen sorption capacity than NiOOH. NiOOH has a higher driving force for $H_2$ uptake. The hydrogen uptake may be realized via the following reactions:

$$MnO_2 + H_2 \rightarrow Mn(OH)_2 \qquad (3) \text{ and}$$

$$NiOOH + \tfrac{1}{2} H_2 \rightarrow Ni(OH)_2 \qquad (4).$$

The high driving force of both $MnO_2$ and NiOOH allow for a wide range of HOR 122 catalysts. The HOR catalyst 122 may be, for example, Pt, a Pt alloy such as Pt—Co or Pt—Ni, or Pd, AgO, $Ag_2O$ catalyst, the like, or a combination thereof.

The sorbent material may include only EMD or NiOOH. Alternatively, the sorbent material may include both EMD and NiOOH. For example, the sorbent 132 may include alternating layers of EMD and NiOOH. The layers may be positioned parallel or perpendicular to the electrolyte 120. In another example, the sorbent 132 may include islands of EMD or NiOOH in a matrix of the alternate material.

The HER catalyst 124 may be, for example, Pt, a Pt alloy such as Pt—Co or Pt—Ni, Pd, or a phosphide such as CoP, MoP, FeP, MnP.

The proton electrolyte 120 may be chosen to be one of sulfonated tetrafluoroethylene-based fluoropolymer-copolymer, polybenzimidazole (PBI), or phosphate glass (e.g. $5P_2O_5 \cdot 95SiO_2$). The conditions of the cell 100 and/or the system 130 may be adjusted based on the chosen materials. For example, if the electrolyte includes sulfonated tetrafluoroethylene-based fluoropolymer-copolymer, the operating conditions of the cell 100 should remain below about 100° C., and the electrolyte may be humidified in the recharge state. Proton transport through the sulfonated tetrafluoroethylene-based fluoropolymer-copolymer in the sorption state should be blocked electrochemically. If the electrolyte includes PBI, humidification may be optional, and the recharge state may proceed at temperatures as high as about 160° C. Proton transport during the sorption state should be be blocked electrochemically. If the electrolyte includes phosphate glass, the recharge state may proceed at about 200° C., ensuring both good proton transport through the glass electrolyte, and good hydrogen removal kinetics from the active sorbent material.

The encapsulation 134 material may include a material which is selectively permeable to $H_2$, but not to carbon monoxide (CO), carbon dioxide ($CO_2$), or nitrogen dioxide ($NO_2$). The encapsulation 134 material may be a polymer, thermoplastic, thermoset. A non-limiting example of the encapsulation material may be polymethyl methacrylate (PMMA) which is selectively permeable to $H_2$, but not to CO, $CO_2$, or $NO_2$.

A method of utilizing system 100 is disclosed. The method may include running a chemical of electrochemical cell 100 in the first state. The method may include enabling, not blocking, proton transport across the electrolyte in the first state. The method may include measuring the amount of hydrogen seeping into a chamber A, where hydrogen presence is undesirable. The method may include switching the system into the second state upon indication that a maximum predetermined concentration of hydrogen was measured/reached in the chamber A. The method may include adsorption of hydrogen from chamber A into the sorbent. The method may include preventing any proton transport from chamber B across the electrolyte in the second state. The method may include sorbing, adsorbing, absorbing hydrogen from chamber A 114 into the sorbent 132. The method may include measuring the amount of hydrogen adsorbed into the sorbent in the second state. The method may include switching from the second state to the first state upon indication that a minimum predetermined amount of hydrogen was measured/reached in chamber A. The method may include switching from the second state to the third state upon indication that a maximum predetermined hydrogen concentration was measured/reached in the sorbent 132. The method may include releasing hydrogen from the sorbent material. The method may include applying a voltage bias across the proton electrolyte 120 to remove hydrogen from the sorbent 132 to the HER catalyst 124 in chamber B 118. The method may include reducing the hydrogen protons to hydrogen gas in the HER catalyst 124. The method may include increasing temperature, pressure, or both to increase speed of the hydrogen release kinetics. The method may include preventing excess $H_2$ diffusion from chamber B 118 by one or more strategies (a)-(c) described above.

In one or more embodiments, an active hydrogen capture and release system 200 is disclosed. The system 200 may minimize hydrogen pressure buildup in a confined system of the chemical or electrochemical cell described above. The system 200 may be located in a chamber that is in close proximity to hydrogen rich areas such that there is physical separation of a hydrogen rich zone, chamber, or area 218, where presence of hydrogen is desirable, and a zone, chamber, or area 214, where presence of hydrogen is not desirable. The hydrogen poor or first zone 214 may have a target predetermined concentration of hydrogen c1. The hydrogen rich or second zone 218 may have a target predetermined concentration of hydrogen c2. c2 is higher than c1. The system 200 may capture traces of leaked hydrogen in the zone 214 and/or from close proximity of electronics 216.

The system 200 may be an active system. The system 200 may include an applied electric field, circuit, potential, voltage source 202 to modulate adsorption energy of hydrogen on an electrode 204. The electric circuit may be internal or external to the system, to the cell. The active system 200 employs electrical bias to capture and release hydrogen gas. A non-limiting example of the system 200 is shown in FIGS. 6A and 6B. The system 200 may capture traces of leaked hydrogen.

FIG. 6A shows a schematic of the system 200 and its components. The system 200 may include two electrodes separated by an air gap. The first electrode 204 may be an adsorbing electrode which may include a material structured to adsorb hydrogen. The second electrode 206 may be a counter electrode. The second electrode 206 may include material which is not structured to adsorb hydrogen. The system 200 may include a physical diffusion barrier layer 212 and one or more electronic components 216, as described above.

The system 200 may include a hydrogen rich zone 218, and a hydrogen free or hydrogen poor zone 214. The zones 214 and 218 may be separated by the physical diffusion barrier layer 212. Hydrogen may be seeping from the zone 218 to the zone 214 despite the barrier layer 212, as is depicted in FIG. 6.

Alternatively, as is shown in FIG. 6B, the two electrode 204, 206 may be separated by an $H_2$-permeable solid dielectric 207 such as PMMA. The dielectric 207 may form a layer, barrier, or both. The dielectric 207 may be coated with a suitable catalyst to promote the dissociation of hydrogen gas into atomic hydrogen. Non-limiting examples of the catalyst may be Pt, Pd, or Ag.

The electrode 204 is formed at least partially, or entirely, from a material structured to adsorb hydrogen having adsorption capacity a1. The electrode 204 may also include a bulk portion 210. The bulk portion 210 may be made from a material which has a second adsorption capacity a2. a2 is lower than a1 such that the bulk portion has a lower adsorption capacity than the adsorption material. Adsorption capacity or loading relates to the amount of adsorbate, in this case hydrogen, taken up by the adsorbent per unit mass of the adsorbent.

The adsorption material may be applied as a coating or top layer 208 on a bulk portion 210, as is shown in FIG. 6A. The coating or top layer may be continuous or discontinuous. The discontinuous top layer may appear as dispersed sites of the adsorbing material. Dispersion of the adsorption sites may form a pattern or be random. The discontinuous top layer may form one or more islands of adsorbing material on the surface of the bulk portion 210.

The top layer 208 and the bulk portion 210 may have the same or different thicknesses.

Alternatively, as is shown in FIG. 6B, the electrode's bulk portion 210 may be made from or include the adsorption material.

The adsorption material of the electrode 204 may provide adsorption surface/site to hydrogen. One or more portions of the electrode or electrode surface may act as adsorption sites to hydrogen. The one or more portions, or the entire surface of the electrode, may include the hydrogen adsorption sites. The one or more portions, adsorption sites may include material imperfections or defects such as vacancies, edges, etc. and/or doping sites including transition metal atoms, alkali metal atoms, etc. The electrode 204 may thus include a first surface with first enhanced value of hydrogen adsorption a1 and a second surface with lower adsorption capability a2, the second value of hydrogen adsorption. The first value may be higher than the second value. The first surface may have one or more enhanced adsorption sites.

The material of the electrode may be, for example, a 2D form of carbon, graphene. electrode may be graphene-based. The electrode 204 may include doped or defected graphene.

The FIGS. 7A-7C depict examples of graphene structures which may be utilized as the electrode material in the system 200. In other words, FIGS. 7A-7C show non-limiting examples of doped graphene structures that may be effective in capturing hydrogen with the application of external electric field 202 of the system 200. The black colored atoms represent doping, white atoms represent hydrogen. FIG. 7A shows a defective graphene sheet with two-five carbon rings locked to two-seven carbon rings ($5^2 7^2$) doped with atom M (black). In FIG. 7B, defective graphene sheet is depicted. The defective graphene sheet includes two-five carbon rings connected to an eight carbon ring ($5^2 8$) doped with atom M (black). M may be, for example, Pt, Ni, Pd, or Li. FIG. 7C shows doped graphene sheet with nitrogen (black).

When doped, defective graphene can be an efficient route for hydrogen capture. Hydrogen adsorbs to a doping atom M in $5^2 7^2$ defect, where atom M is located on a bridge site (FIG. 7A) or in $5^2 8$ defect, where atom M is located in octatomic ring (FIG. 7B).

Atom M may be a transition metal or an element in the d-block of the Periodic Table of elements, which includes group III to XIIB on the periodic table. Atom M may be Ni, Co, Pd, Pt, Fe, Ru, Co, Rh, Ir, Ni, Pd, Pt, Cu, Ag, or Au. Alternatively, atom M may be an alkali metal or an element from group IA of the Periodic Table. Atom M may be Li, Na, K, or Rb.

The system 200 functions as an active hydrogen pump structured to capture and release hydrogen gas. The system 200 works by applying electric field normal to the graphene plane, which significantly enhances adsorption of hydrogen. Specifically, the application of external electric field reduces the barrier for hydrogen chemisorption by polarizing the $H_2$ molecule and activate the electrode adsorption material to capture hydrogen. Additionally, the applied field promotes dopant dispersion and minimizes clustering, which enhances the gravimetric capacity or the amount of $H_2$ adsorbed per unit mass of the system 200. Applying electric field pointing away from the graphene plane causes an increase in binding energy, while flipping the field direction causes reduction in binding energy, allowing the release of hydrogen. The field reversal may be implemented by a positive or negative voltage bias on the electrode. The counter electrode 206 acts as ground.

The applied field increases hydrogen adsorption energy of the adsorption sites of the electrode 204, effectively trapping floating hydrogen molecules in the material of the electrode 204, and reducing hydrogen concentration and buildup near the digital components 216 in the system 200. The adsorption sites are thus activatable by the application of the electric field as described above.

Further still, another form of doping considers the addition of nitrogen (FIG. 7C). When nitrogen is present, no defect is needed to be present in the graphene sheet where N is embedded. Additionally, nitrogen doping often does create associated defects near the doping site. The application of external field, described above, promotes the transition of hydrogen molecule to split near the nitrogen atom and get adsorbed in its atomic form to the adsorption site(s) in the graphene sheet.

The system 200 has a first or capture mode or cycle and a second or release mode or cycle. In the capture mode, the external electric field normal or specific voltage is applied to the electrode 204. In the capture mode, the external electric field normal or specific voltage is applied to reduce the barrier for hydrogen chemisorption by polarizing the $H_2$ molecule. If the electrode 204 contains vacancies or doping, as was described above, adsorption of hydrogen by the adsorption sites on the electrode 204 is enhanced, and hydrogen is being captured or trapped in the adsorption sites of the material. If the electrode 204 includes nitrogen, hydrogen molecules split near the nitrogen atom and get absorbed in the atomic form to the adsorption site(s) in the electrode material.

In the release mode, a change in the electric field is made to allow the electrode 204 to reset, and the captured or trapped hydrogen is safely ejected out of the system 200 into the surrounding environment. The desorption of hydrogen may be facilitated by reversing the field direction and/or switching the electrical circuit 202 off. Switching off the applied voltage or reversing the field direction releases the adsorbed hydrogen due to the significant reduction in the adsorption energy. To avoid kinetic barriers of hydrogen release, the polarity of the electrode 204 may be reversed. At the end of the release mode, the electrode's adsorption sites are emptied or cleared and ready to capture more hydrogen.

To refresh the electrode 204 during desorption, the hydrogen is removed from the system 200. The hydrogen removal may be conducted by several different ways. For example, the electrode 204 may be a removable and replaceable component of the system 200. Hence, when the electrode's adsorption sites are filled to a predetermined level, the electrode 204 may be removed from the system 200 and a new electrode 204 installed.

Alternatively, the system 200 may be placed in an environment that will remove hydrogen into the environment during the desorption cycle. Such environment may be a high temperature or low pressure external environment.

Alternatively still, the system 200 may include one or more types of additives that create an oxidizing environment such as OH radicals or peroxides, Pt-wire or other catalysts, or the like, that can oxidize the hydrogen into water.

Further, the system 200 may receive or be exposed to an item acting as "hydrogen getter" during the desorption cycle such that undesirable captured hydrogen is forced to leave the system 200. A non-limiting example of the "hydrogen getter" may be transition-metals or transition-metal oxides, especially those involving rare earth elements such as Ce and/or La.

Similarly to the system 100, the system 200 may include gas and/or voltage sensors 242, 244 monitoring concentration of hydrogen in the system. For example, the system 200 may include a gas or voltage sensor 242, 244 near, adjacent to, or directly adjacent to the one or more electric components 216, the electrode 204, the like, or a combination thereof.

A method of using the system 200 is disclosed. The method may include utilizing an electrical circuit and hydrogen adsorption material to capture and release hydrogen atoms to reduce hydrogen concentration near one or more digital components of the system. The method may include measuring, detecting, monitoring, maintaining concentration of hydrogen in the system, cell, pump, near, adjacent to, directly adjacent to the electrode 204, the electrode 206, the one or more electric components 216. The method may include adjusting, lowering concentration of hydrogen the system, cell, pump, near, adjacent to, directly adjacent to the electrode 204, the electrode 206, the one or more electric components 216.

The method may include increasing hydrogen adsorption capacity of one or more adsorbing sites on an adsorbing electrode. The increasing may include applying electric field normal to a plane of the adsorbing electrode. The method may include capturing hydrogen by the one or more adsorbing site of the adsorbing electrode. The method may include polarizing hydrogen molecules present in the system by the electrical circuit. The method may include utilizing defective material such as including vacancies, doping element, etc. as the adsorption sites.

The method may include releasing the captured hydrogen from the one or more adsorbing sites, the electrode, the system, or a combination thereof. The method may include utilizing the electrical circuit to release the captured hydrogen. The decreasing may include reducing the hydrogen adsorption capacity of the one or more adsorbing sites. The reducing may include causing a change in the electric field. The reducing may include the field reversal. The reducing may include switching the field off.

In one or more embodiments, a chemical or electrochemical system 300 is disclosed. The system 300 includes a hydrogen pump component 303 configured to protect electrical components 316, present in the system 300, from exposure to high concentrations of $H_2$ gas. The pump 303 may supplement or replace a physical diffusion barrier 312 to maintain the $H_2$ concentration in the vicinity of the control circuitry and/or other digital components 316 below a predefined level.

Figure 8:
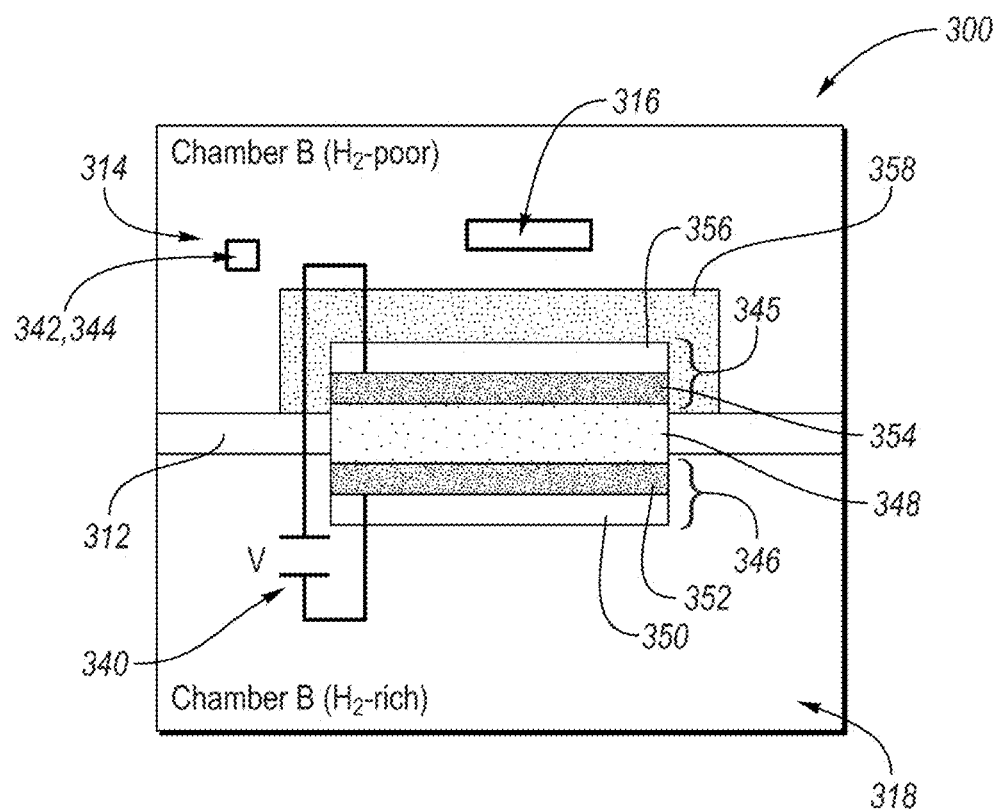
FIG. 8 shows a schematic depiction of a non-limiting example of an electrochemical cell with a hydrogen pump.

A non-limiting example of the system 300 is shown in FIG. 8. The system 300 may include an electrochemical cell 300, where hydrogen in transport is controlled by a voltage bias between two electrodes 345, 346. The system/pump 300/303 may include a symmetrical electrochemical cell, where both cathode 346 and anode 345 perform the hydrogen redox reaction:

$$\tfrac{1}{2}H_2 \leftrightarrow H^+ + e^- \quad (5).$$

The net reaction is then:

$$H_2^{(A)} \rightarrow H_2^{(B)} \quad (6),$$

where $H_2^{(A)}$ and $H_2^{(B)}$ refer to hydrogen gas in the hydrogen rich and hydrogen poor zones 318, 314.

The free energy of reaction (6) is defined by the concentrations of $H_2$ in chambers 314 and 318 and the voltage applied across the external circuit:

$$\Delta G = RT\, Ln(p_B/p_A) - FV \quad (7),$$

where $p_A$ and $p_B$ are the partial pressures of $H_2$ in chambers 314 and 318, R is the ideal gas constant, T is the temperature in Kelvin, F is the Faraday constant, and V is the voltage bias across the external circuit.

At equilibrium, where $\Delta G=0$, the applied voltage bias thus sets the ratio of partial pressures of hydrogen in chambers 314 and 318. Given that the partial pressure in chamber 318 is a known controlled quantity, the voltage bias can then be set to maintain the $H_2$ level in chamber 314 at a pre-defined level. The open-circuit voltage may be used to measure the $H_2$ concentration in chamber 314 relative to that of chamber 318.

The electrodes 345, 346 are separated by a proton-conductive electrolyte 348 and an external circuit 340. The electrodes are a cathode 346 in the hydrogen rich portion of the system 318 and an anode 345 in the hydrogen poor or hydrogen free portion of the system 314.

The pump 303 may be an active electrochemical pump. The pump 303 is configured to maintain the $H_2$ concentration near one or more control electronics 316 below a pre-defined level. The system 300 utilizes voltage to conduct hydrogen from one zone 314 to the other 318. As such, the system 300 requires constant voltage to operate. The system 300 may be a constantly running or continuously running system. The system 300 may be free of a hydrogen sorbent material. The system 300 may include a sorbent. The sorbent may be a sorbent described above with respect to the system 100, 200, or both. The pump 303 may be located adjacent or directly adjacent to the high-hydrogen cathode.

The pump 303 operates by applying a voltage across the external circuit 340 to drive proton transport across the electrolyte 348 from one electrode to the other. By applying an appropriate bias, $H_2$ that diffuses across the physical diffusion barrier may thereby be pumped out of the chamber or zone 314 containing the $H_2$-sensitive control electronics 316.

As is shown in FIG. 8, the pump 303 may be integrated into the hydrogen diffusion barrier 312. The pump may include a stack of cathode 346 and anode 345 components. Specifically, the pump 303 may include a cathode gas diffusion layer (GDL) 350, cathode catalyst 352, electrolyte 348, anode catalyst 354, anode GDL 356, and anode encapsulation 358. The anode encapsulation 358 may serve the same purpose as the encapsulation 134, described herein. The encapsulation 358 may be selectively permeable to $H_2$, but not to $CO_2$, CO, and $NO_2$, which may poison the anode catalyst.

The external circuit 340 connecting the anode 345 and cathode 346 is biased to drive $H^+$ current from the anode 345 to the cathode 346, thereby pumping any $H_2$ that diffused into $H_2$-poor chamber 314 across the $H_2$ diffusion barrier 312 back into the $H_2$ rich chamber 318.

To ensure that the $H_2$ pump 303 is able to operate close to thermodynamic equilibrium, at least some of following conditions may need to be met:

(I) The cathode catalyst 352 is able to perform the hydrogen evolution reaction (HER: $H^+ + e^- \rightarrow \tfrac{1}{2}H_2$) with minimum overpotential.

(II) The cathode GDL 350 can provide sufficient transport to the produced $H_2$ gas to ensure that the $H_2$ partial pressure at the cathode 346 is the same as that in the chamber or zone 318.

(III) The electrolyte 348 provides sufficient conductivity for $H^+$ to minimize Ohmic losses while blocking any electrical currents.

(IV) The anode catalyst 354 is able to perform the hydrogen oxidation reaction (HOR: $\tfrac{1}{2}H_2 \rightarrow H^+ + e^-$) with minimum overpotential.

(V) The anode GDL 356 can provide sufficient transport to $H_2$ gas to ensure that the $H_2$ partial pressure at the anode 345 is the same as that in chamber 314.

(VI) All components of the system 300 and/or the pump 303 remain stable at the operating conditions of the pump 303. Specifically, the catalysts 352, 354 are not poisoned by other gases (air, CO, $CO_2$) present in chambers 314, 318. To protect the cathode catalyst 352, anode catalyst 354, or both, the anode 345 may be encapsulated in a material selectively permeable to $H_2$, but not to CO, $CO_2$, and/or $NO_2$. A non-limiting example of such a material may be PMMA.

Non-limiting examples of the anode catalyst 354 may be Pt, a Pt-alloy such as Pt—Co or Pt—Ni or Pd.

The cathode catalyst 352 may be Pt, a Pt-alloy or Pd, or a metal phosphide such as CoP, MoP, FeP, or MnP. The cathode and anode GDLs 350, 356 may include porous carbon, analogous to those used in polymer electrolyte membrane fuel cells (PEMFC). The electrolyte 348 may be made from a material mentioned above. Other materials are contemplated for all the components.

Just like the system 100 described above, the system 300 may include one or more gas or voltage sensors 342, 344 to determine the quantity or concentration of $H_2$ present in the chamber A 314. The gas, voltage sensor(s) 342, 344 may be equivalent to gas, voltage sensor(s) 142, 144 described above. The one or more gas, voltage sensor 342, 344 may be connected to a CPU, processing unit, memory, etc. that runs an algorithm to determine the hydrogen concentration at which to activate the pump 303.

The system 300, pump 303, or cell, may include a controller. The controller may be present in the hydrogen poor zone, chamber, or area 314. The controller may be the electronic digital component 316. The controller may operate the pump 303 based on one or more inputs. The one or more inputs may include concentration of hydrogen in the hydrogen rich zone, concentration of hydrogen in the hydrogen poor zone, predetermined concentration of hydrogen in the cell, zone 314, zone 318, partial pressure in the hydrogen rich zone, partial pressure in the hydrogen poor zone, temperature in the hydrogen rich zone, temperature in the hydrogen poor zone, ratio of partial pressure in the hydrogen poor zone and hydrogen rich zone, or a combination thereof. The controller may generate one or more outputs such as value of voltage bias to be set/applied to maintain the $H_2$ level the hydrogen poor zone at the pre-defined level. The controller may generate input based on the formula (7). The controller may operate the pump close to thermodynamic equilibrium. The controller may collect input regarding conditions (I) to (VI). If the conditions are met, the controller may operate the pump. If the conditions are not met, the controller may stop operating the pump. The controller may initiate correction within the system such that the conditions (I) to (VI) are met while the pump is operating.

A method of utilizing the pump of the system 300 is disclosed. The method may include one or more of the following tasks performed, directed, or controlled by a controller. The method may include operating a hydrogen pump of the system 300 to maintain the $H_2$ concentration in the vicinity of the control circuitry and/or other digital components 316 below a pre-defined level. The method may include controlling hydrogen transport in the system 300 by a voltage bias between the two electrodes 345, 346. The method may include utilizing voltage to conduct hydrogen from one zone 314 to the other 318. The method may include applying a voltage across the external circuit 340 to drive proton transport across the electrolyte 348 from one electrode to the other. The method may include pumping $H_2$ which diffuses across the physical diffusion barrier from the hydrogen rich zone to the hydrogen poor zone, back to the hydrogen rich zone.

The method may include setting the voltage bias to maintain the $H_2$ level in chamber 314 at a pre-defined level based on the partial pressure value in the hydrogen rich zone. The method may include determining the partial pressure value in the hydrogen rich zone. The method may include measuring $H_2$ concentration in the hydrogen poor zone relative to that of the hydrogen rich zone based on the open-circuit voltage.

The method may include operating the pump continuously. The method may include operating the pump close to thermodynamic equilibrium. The method may include measuring hydrogen concentration in the system. The method may include measuring voltage within the system. The method may include checking, ensuring if the conditions (I) to (VI) are met. The method may include making adjustments to the system to ensure that the conditions (I) to (VI) are met.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrochemical system comprising:
   a hydrogen diffusion barrier physically separating the system into a hydrogen rich zone and a hydrogen poor zone,
   an electronic component located in the hydrogen poor zone and exposed to hydrogen diffusing from the hydrogen rich zone,
   a hydrogen pump, located in the hydrogen rich zone and the hydrogen poor zone, including:
      a cathode,
      an anode,
      an electrolyte separating the cathode and the anode,
      an anode encapsulation contacting the anode and a portion of the electrolyte, and
      an external electrical circuit biased to drive H+ current from the anode to the cathode to pump hydrogen diffusing from the hydrogen rich zone into the hydrogen poor zone back into the hydrogen rich zone.

2. The electrochemical system of claim 1, wherein the hydrogen pump operates at a thermodynamic equilibrium state.

3. The electrochemical system of claim 1, wherein the hydrogen pump is a continuously running pump.

4. The electrochemical system of claim 1, wherein the anode encapsulation includes a material selectively permeable to $H_2$, but not to $CO$, $CO_2$, and/or $NO_2$.

5. The electrochemical system of claim 1, wherein the anode has a catalyst configured to perform hydrogen oxidation reaction with minimum overpotential.

6. The electrochemical system of claim 1, wherein the system has a mode of $H_2$ partial pressure at the cathode being the same as $H_2$ partial pressure in the hydrogen rich zone.

7. The electrochemical system of claim 1, wherein the system has a mode of $H_2$ partial pressure at the anode being the same as $H_2$ partial pressure in the hydrogen poor zone.

8. The electrochemical system of claim 1, wherein the electrical component is programmed to maintain hydrogen concentration in the hydrogen poor zone below a predetermined level.

9. The electrochemical system of claim 1, wherein the hydrogen pump is integrated into the hydrogen diffusion barrier.

10. An electrochemical system comprising:
a symmetrical electrochemical cell, divided by a physical diffusion barrier, into a cathode side and an anode side, the cell including:
a cathode and an anode, each configured to perform hydrogen redox reaction,
an electrolyte layered between the cathode and the anode,
and an electrical circuit biased to drive H+ current from the anode to the cathode, and
a controller located on the anode side and programmed to maintain hydrogen concentration on the anode side below a pre-determined level by setting voltage bias of the electrical circuit.

11. The electrochemical system of claim 10, wherein the controller is further programmed to set the voltage bias based on a value of partial pressure on the cathode side.

12. The electrochemical system of claim 10, wherein the controller is further programmed to operate the cell at a thermodynamic equilibrium state.

13. The electrochemical system of claim 10, further comprising an encapsulation on the anode side.

14. The electrochemical system of claim 10, wherein the controller is a central processing unit.

15. A method comprising:
by a controller, operating a hydrogen pump located within an electrochemical cell to maintain a hydrogen concentration relative to an electronic component in a hydrogen poor zone of the cell below a predetermined level based on a partial pressure value in a hydrogen rich zone.

16. The method of claim 15, where the operating includes applying voltage bias across an external circuit to drive proton transport across an electrolyte from an anode, in the hydrogen poor zone, to a cathode, in the hydrogen rich zone of the cell.

17. The method of claim 15, wherein the operating includes continuously operating the hydrogen pump.

18. The method of claim 15, wherein the method further includes measuring $H_2$ concentration in the hydrogen poor zone relative to $H_2$ concentration of the hydrogen rich zone based on the circuit voltage.

19. The method of claim 15, wherein the controller is located in the hydrogen poor zone.

20. The method of claim 15, wherein the controller is further programmed to operate the hydrogen pump at a thermodynamic equilibrium state.

* * * * *